US011226731B1

(12) United States Patent
Burfitt et al.

(10) Patent No.: US 11,226,731 B1
(45) Date of Patent: Jan. 18, 2022

(54) SIMULATED INTERACTIVE PANORAMAS

(71) Applicant: Snap Inc., Santa Monica, CA (US)

(72) Inventors: Joseph Burfitt, Santa Monica, CA (US); Andrew Grosvenor Cooper, Los Angeles, CA (US); Yamill Antonio Vallecillo, Los Angeles, CA (US); Sivakumar Loganathan, San Francisco, CA (US); Gene Michael Cahill, Jr., San Jose, CA (US); Lei Zhang, Mountain View, CA (US)

(73) Assignee: Snap Inc., Santa Monica, CA (US)

(*) Notice: Subject to any disclaimer, the term of this patent is extended or adjusted under 35 U.S.C. 154(b) by 166 days.

(21) Appl. No.: 15/879,202

(22) Filed: Jan. 24, 2018

(51) Int. Cl.
*G06F 3/0485* (2013.01)
*G06F 3/0481* (2013.01)
*H04N 5/232* (2006.01)
*G06F 3/0488* (2013.01)
*H04N 21/47* (2011.01)
*H04N 21/431* (2011.01)
*G06F 3/0346* (2013.01)

(52) U.S. Cl.
CPC .......... *G06F 3/0485* (2013.01); *G06F 3/0481* (2013.01); *G06F 3/04883* (2013.01); *H04N 5/23238* (2013.01); *H04N 21/4316* (2013.01); *H04N 21/47* (2013.01); *G06F 3/0346* (2013.01)

(58) Field of Classification Search
CPC .... G06F 3/0485; G06F 3/0346; G06F 3/0481; G06F 3/04883; H04N 5/23238; H04N 5/44591; H04N 21/47; H04N 21/4316
USPC ....................................................... 715/720
See application file for complete search history.

(56) References Cited

U.S. PATENT DOCUMENTS

| 6,356,945 | B1* | 3/2002 | Shaw | ................... H04N 19/51 |
| | | | | 709/231 |
| 9,082,018 | B1* | 7/2015 | Laska | ............ G08B 13/19684 |
| 2004/0145593 | A1* | 7/2004 | Berkner | ................. G06T 11/60 |
| | | | | 345/619 |
| 2005/0174462 | A1* | 8/2005 | Brost | ................... H04N 5/2628 |
| | | | | 348/333.09 |
| 2005/0229111 | A1* | 10/2005 | Makela | ................ G06F 3/0481 |
| | | | | 715/802 |
| 2010/0173678 | A1* | 7/2010 | Kim | ................ H04N 5/232935 |
| | | | | 455/566 |
| 2010/0289825 | A1* | 11/2010 | Shin | .................... G06F 3/04845 |
| | | | | 345/667 |
| 2011/0307581 | A1* | 12/2011 | Furbeck | ................. H04L 67/34 |
| | | | | 709/219 |

(Continued)

OTHER PUBLICATIONS

Power Tips For Cropping in Adobe Lightroom, Industry Dev, available at https://industrydev.com/power-tips-for-cropping-in-adobe-lightroom/ (Aug. 19, 2016).*

*Primary Examiner* — Sherief Badawi
*Assistant Examiner* — Conrad R Pack
(74) *Attorney, Agent, or Firm* — Schwegman Lundberg & Woessner, P.A.

(57) ABSTRACT

A panoramic system can receive content (e.g., live video) recorded in a landscape orientation and use a portrait dynamic crop window to display a portrait area of the received content. The panoramic system can further display the content in a landscape dynamic crop window that has a moveable user interface control that can pan the portrait crop window as the content plays in one or both of the dynamic crop windows.

17 Claims, 21 Drawing Sheets

(56) References Cited

U.S. PATENT DOCUMENTS

| | | | |
|---|---|---|---|
| 2012/0159314 A1* | 6/2012 | Schrier | G06F 16/9577 715/252 |
| 2014/0194164 A1* | 7/2014 | Lee | G06F 3/0485 455/566 |
| 2014/0337738 A1* | 11/2014 | Auterinen | G11B 27/005 715/720 |
| 2015/0121303 A1* | 4/2015 | Zhu | G06F 3/048 715/800 |
| 2016/0249015 A1* | 8/2016 | Atkinson | H04N 21/4223 |
| 2016/0381306 A1* | 12/2016 | Yang | G11B 27/031 386/280 |

\* cited by examiner

SIMULATED INTERACTIVE PANORAMAS

TECHNICAL FIELD

The present disclosure generally relates to special-purpose machines that manage image processing and improvements to such variants and to the technologies by which such special-purpose machines become improved compared to other special-purpose machines for interactive panoramic user interfaces.

BACKGROUND

There are different types of recording approaches, including recording in landscape mode or portrait mode. Content recorded in one mode often plays poorly on a device configured for the other mode. For example, viewing widescreen video on a smartphone phone held upright (i.e., in portrait mode) can cause the widescreen video to be shrunken so that it fits the screen. Likewise, viewing vertical video on a widescreen player often causes the vertical video to be displayed in the middle of the widescreen viewing area with large swaths of space left unused, which results in a poor user viewing experience.

BRIEF DESCRIPTION OF TILE DRAWINGS

To easily identify the discussion of any particular element or act, the most significant digit or digits in a reference number refer to the figure ("FIG.") number in which that element or act is first introduced.

Figure 10A:
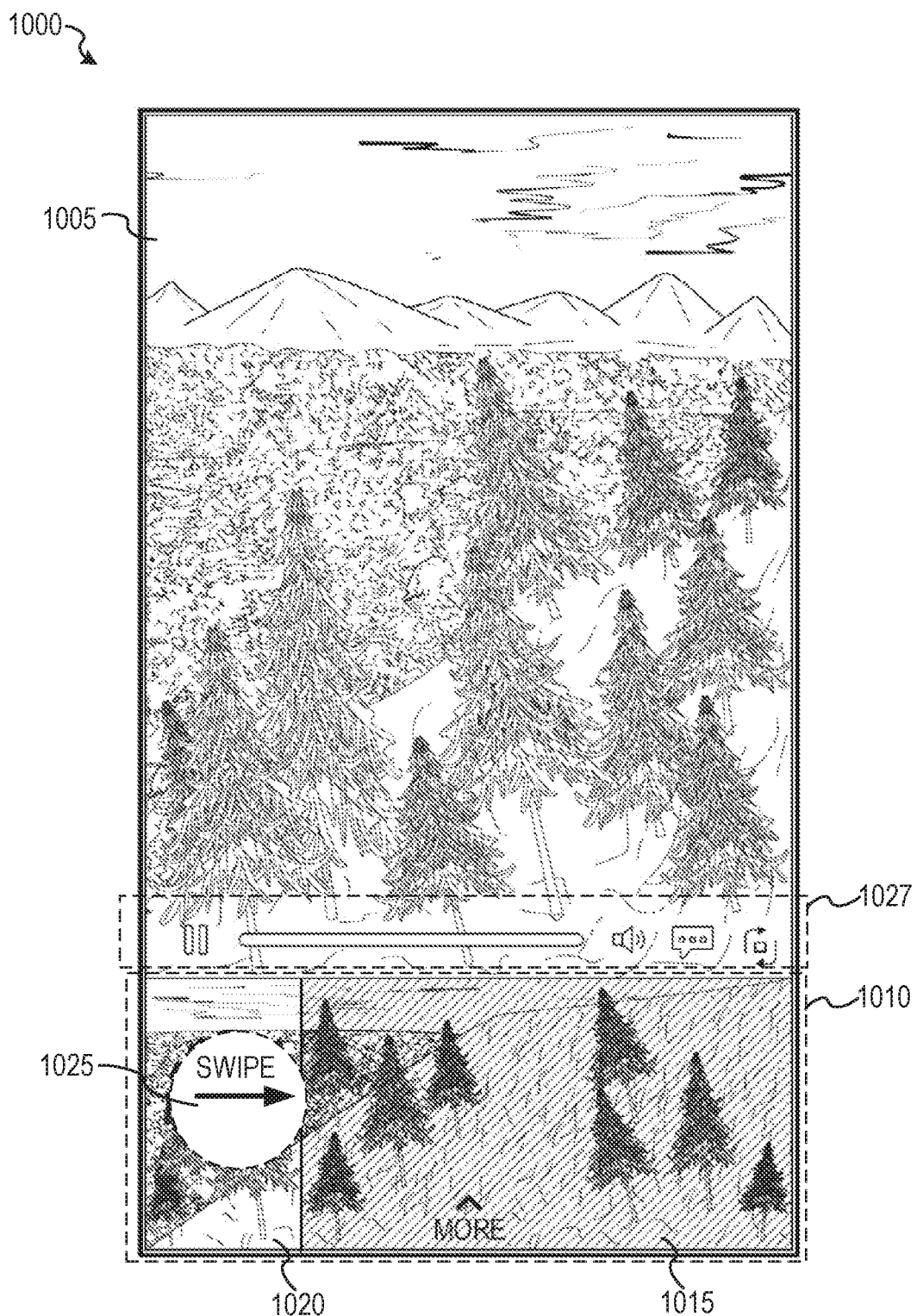
Figure 10B:
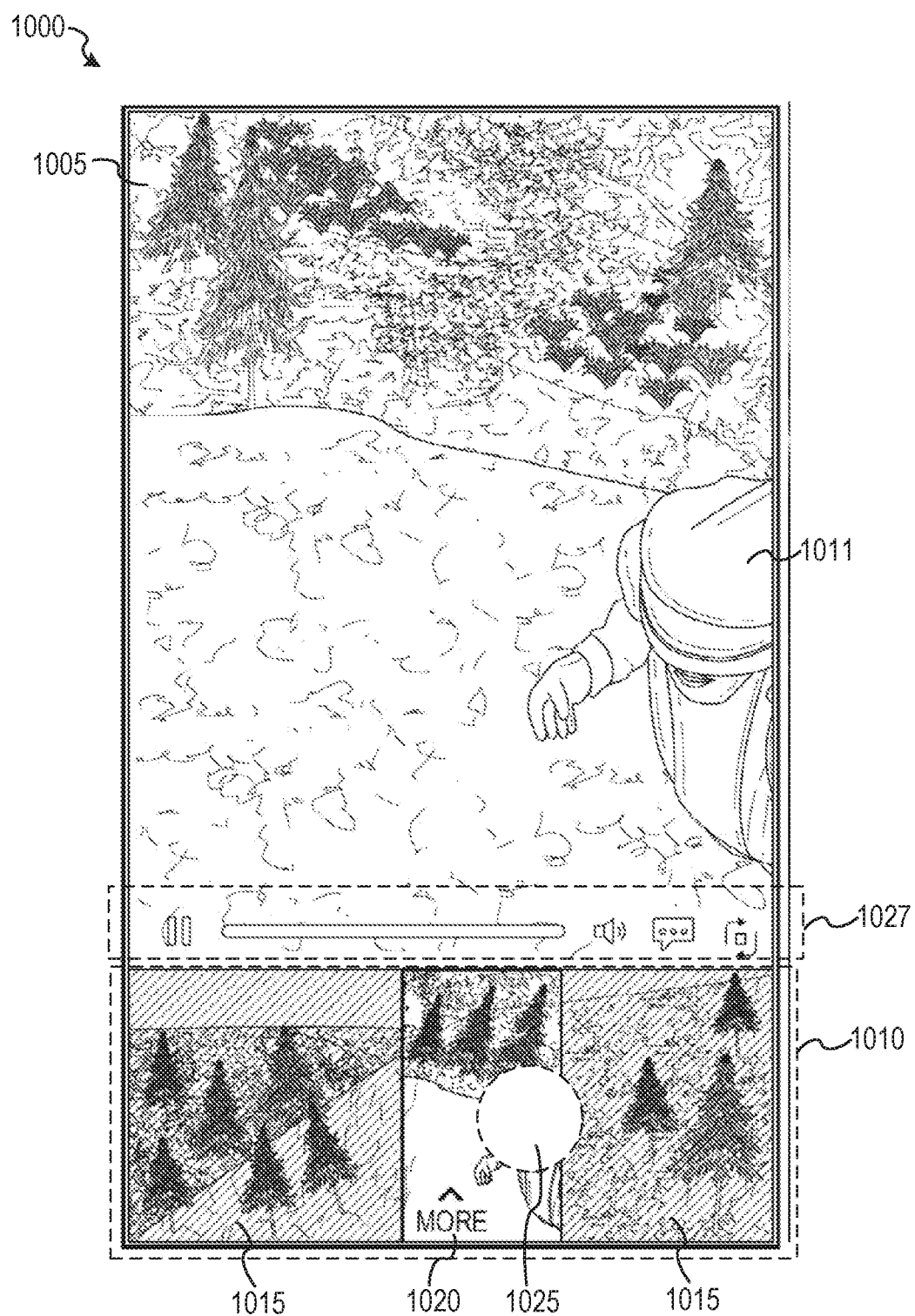
Figure 10C:
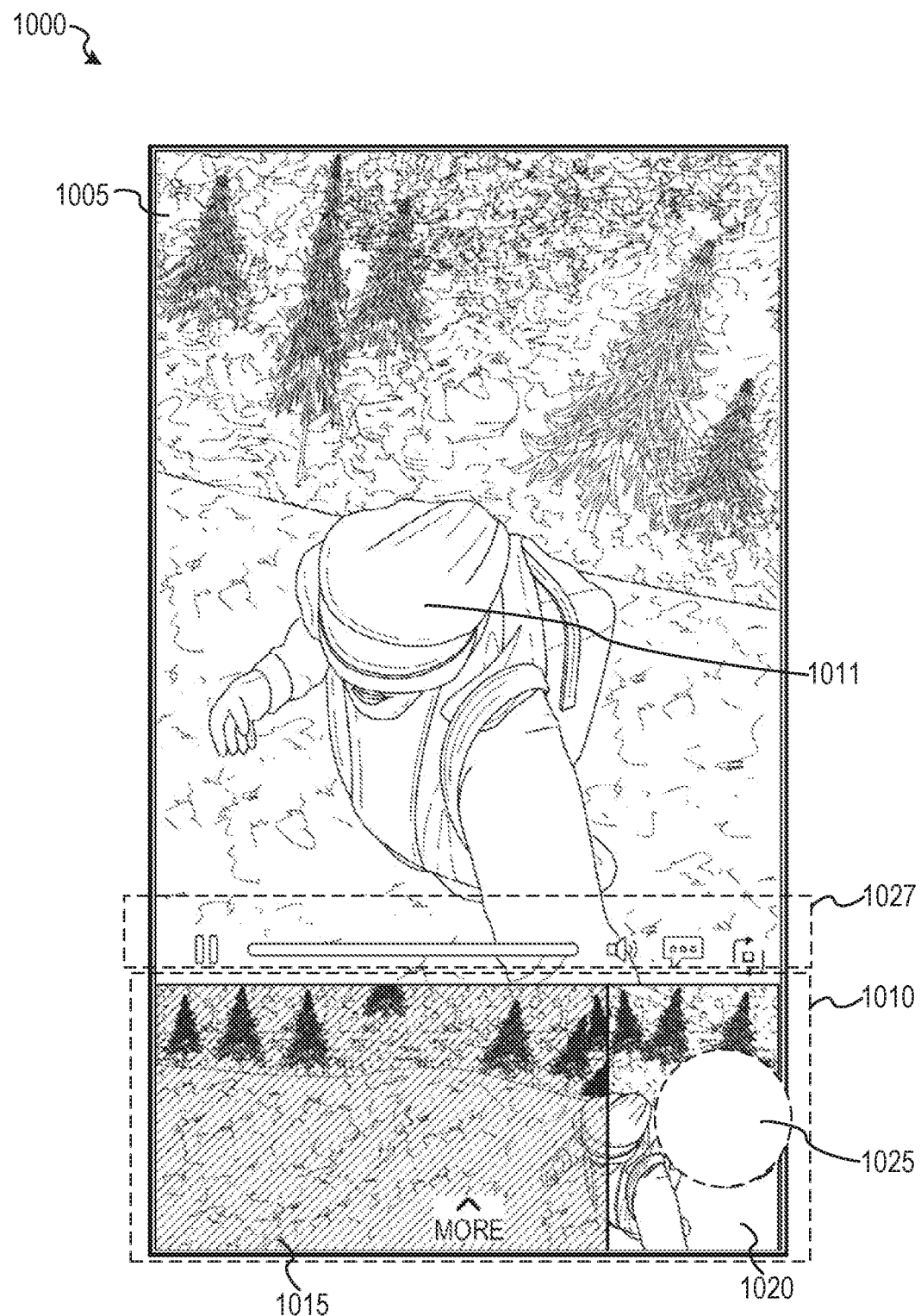

FIG. 10A-C show an example user interface for displaying panoramic content, according to some example embodiments.

FIGS. 11A-11D shows a further example of a simulated interactive panoramic user interface, according to some example embodiments.

Figure 12:
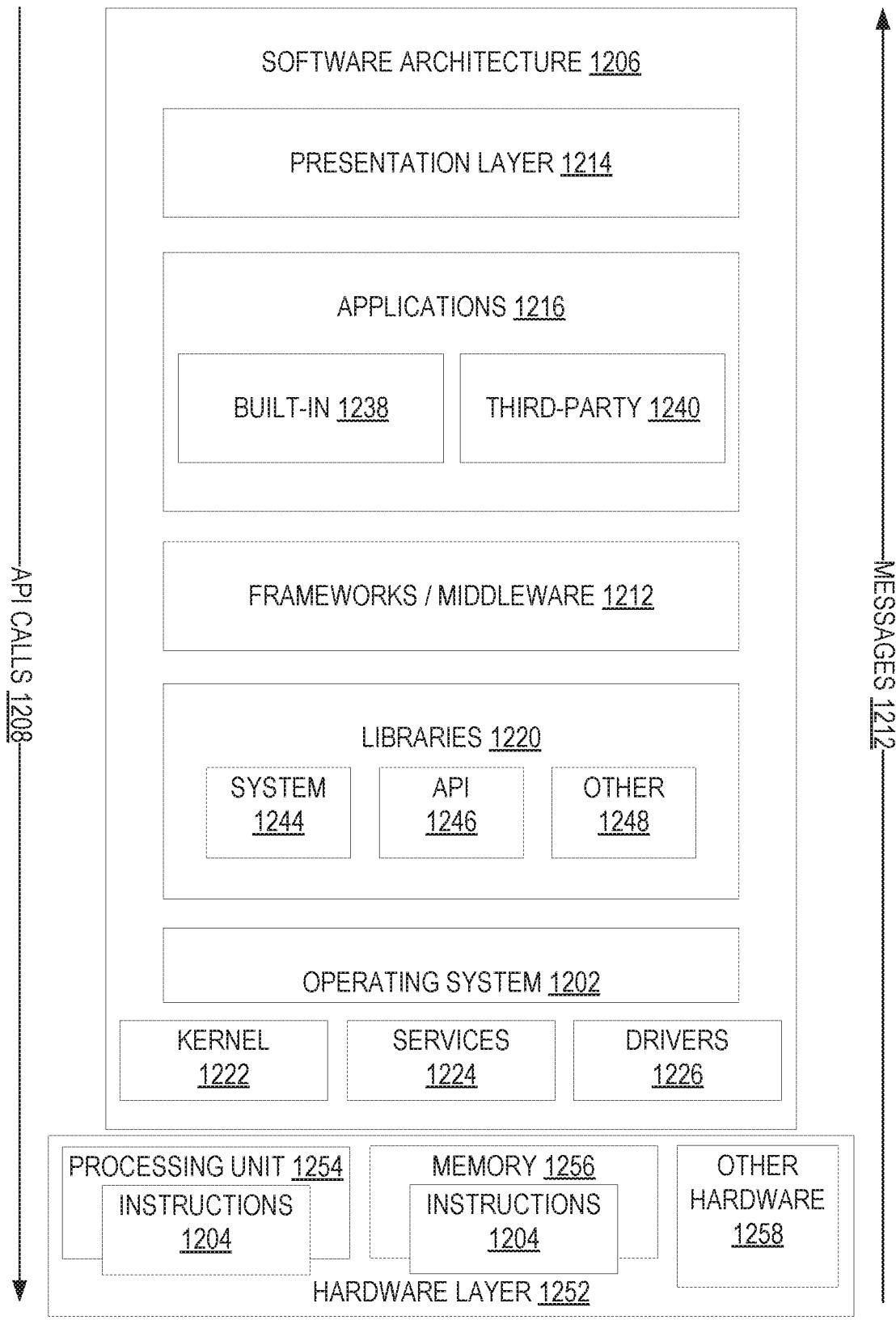

FIG. 12 is a block diagram illustrating a representative software architecture, which may be used in conjunction with various hardware architectures herein described.

Figure 13:
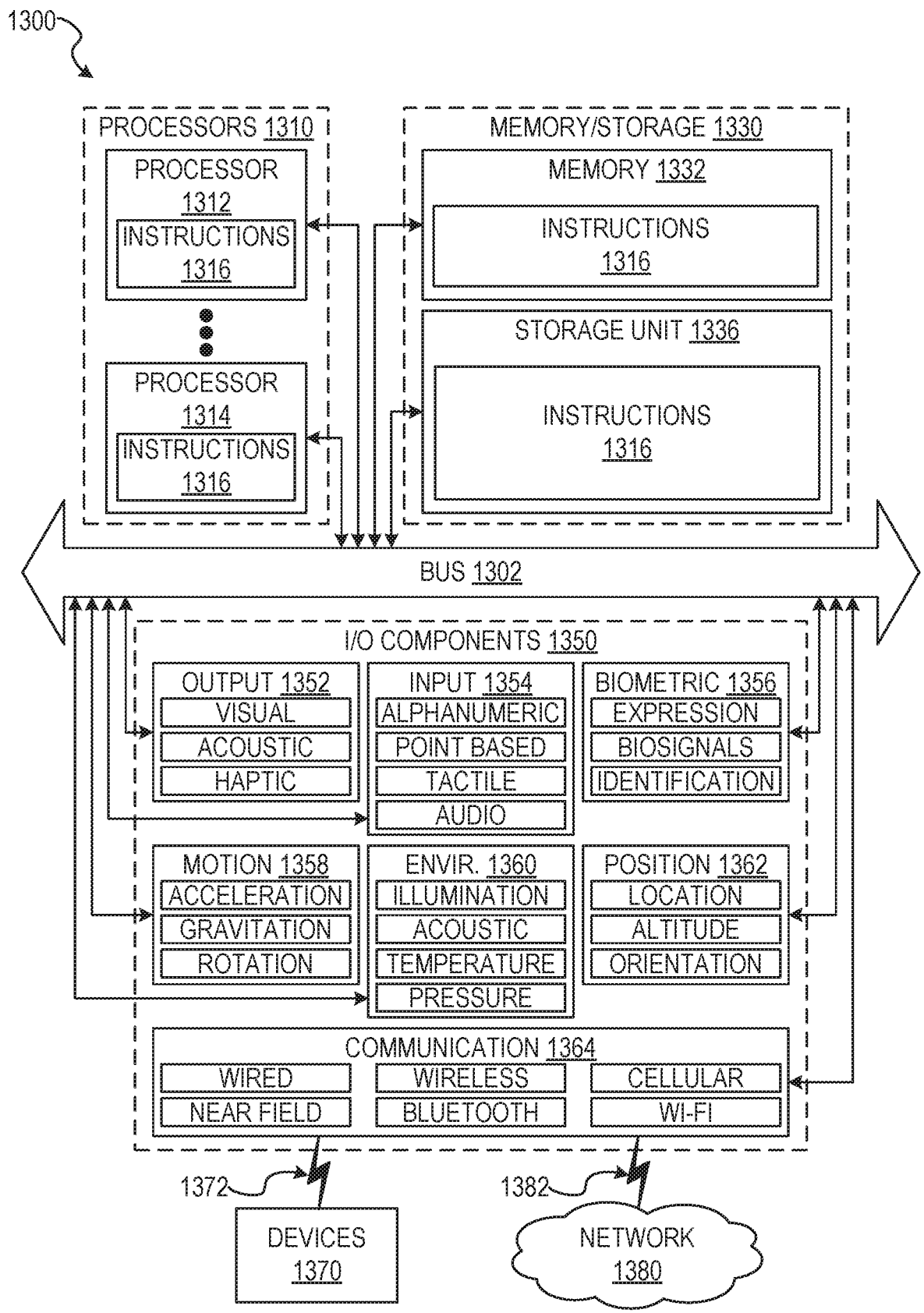

FIG. 13 is a block diagram illustrating components of a machine, according to some example embodiments, able to read instructions from a machine-readable medium (e.g., a machine-readable storage medium) and perform any one or more of the methodologies discussed herein.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, viewing landscape content on a portrait oriented player, and vice versa, can result in a poor user experience. To this end, a panoramic system can display content (e.g., live streaming video) in cropped portrait area, and further display the content in its original orientation (e.g., aspect ratio) in a panoramic window below the portrait area in a down-sampled format. The panoramic window may use a current view indicator to display what portion of the original content is being displayed in the portrait area and further indicate what portions are out-of-frame. A user can move portrait area to a different area of the original content (e.g., panning) by moving the current view indicator in the panoramic window. As the user moves the current view indicator, the content is played in both the portrait area and the panoramic window, thereby giving the user an immersive viewing experience using non-specialized cameras and display devices. In some embodiments, current view indicator moves along one axis of freedom (e.g., slides from left to right) to facilitate smoothly panning to a different area. Further, in some example embodiments, the landscape content is live streamed video that is recorded and viewed in real-time or near real time depending on network conditions. Users of a social media network site can receive a user interface notification that a live stream viewable through the panoramic user interface. In some embodiments, when the stream ends the content is no longer viewable or accessible to the end-user client devices. The panoramic user interface can also be used to view different types of content, such as an image, a panoramic content (e.g., panoramic image, 360 degree stitched image, 360 degree video), downloaded standard video, and broadcast media (e.g., television).

Figure 1:
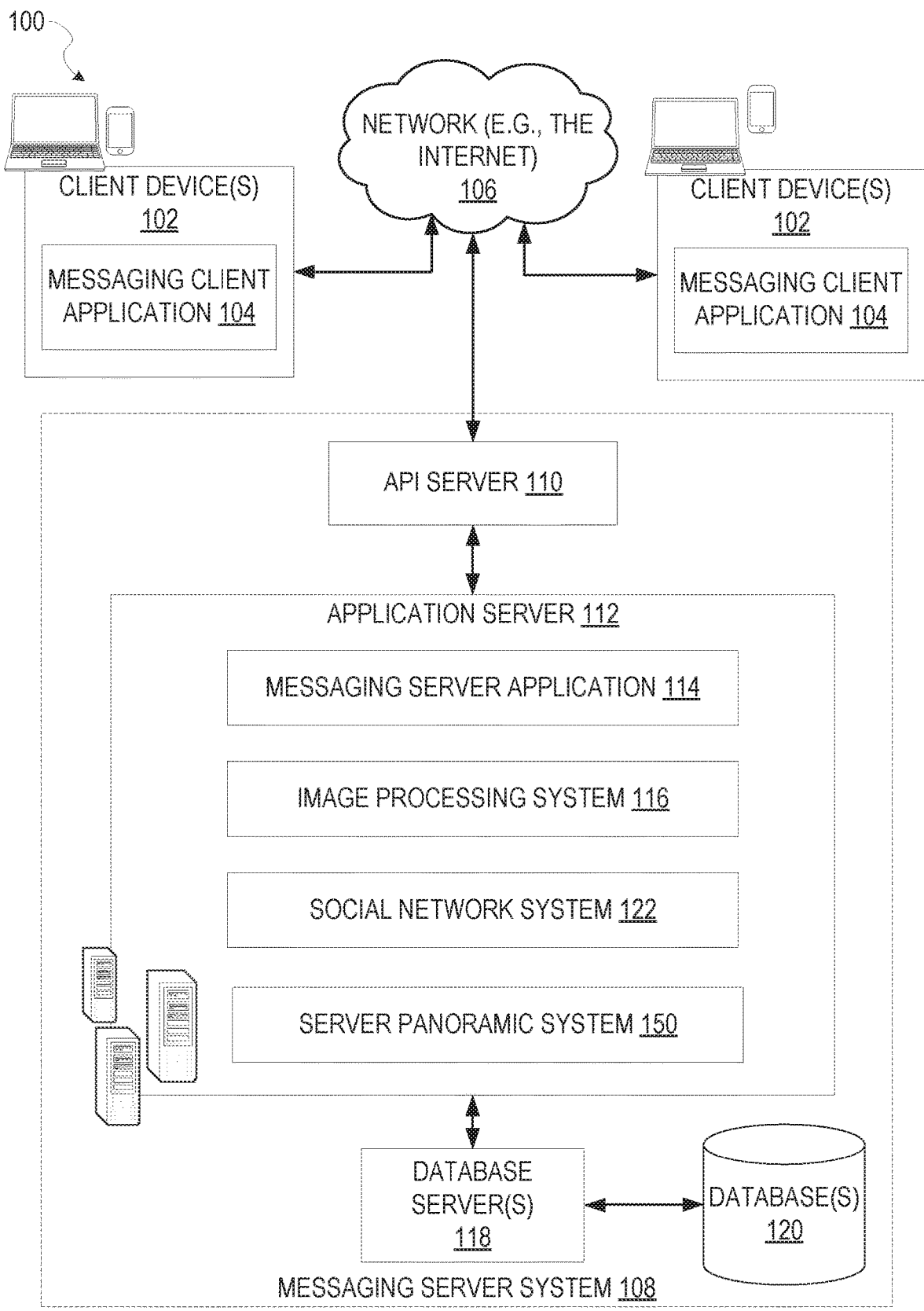
FIG. 1 is a block diagram showing an example messaging system for exchanging data (e.g., messages and associated content) over a network.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a server panoramic system 150, in some example embodiments. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to the database server 118, which facilitates access to the database 120 in which is stored data associated with messages processed by the messaging server application 114.

The server panoramic system 150 manages receiving content for distribution and display on panoramic user interfaces of client devices.

Figure 2:
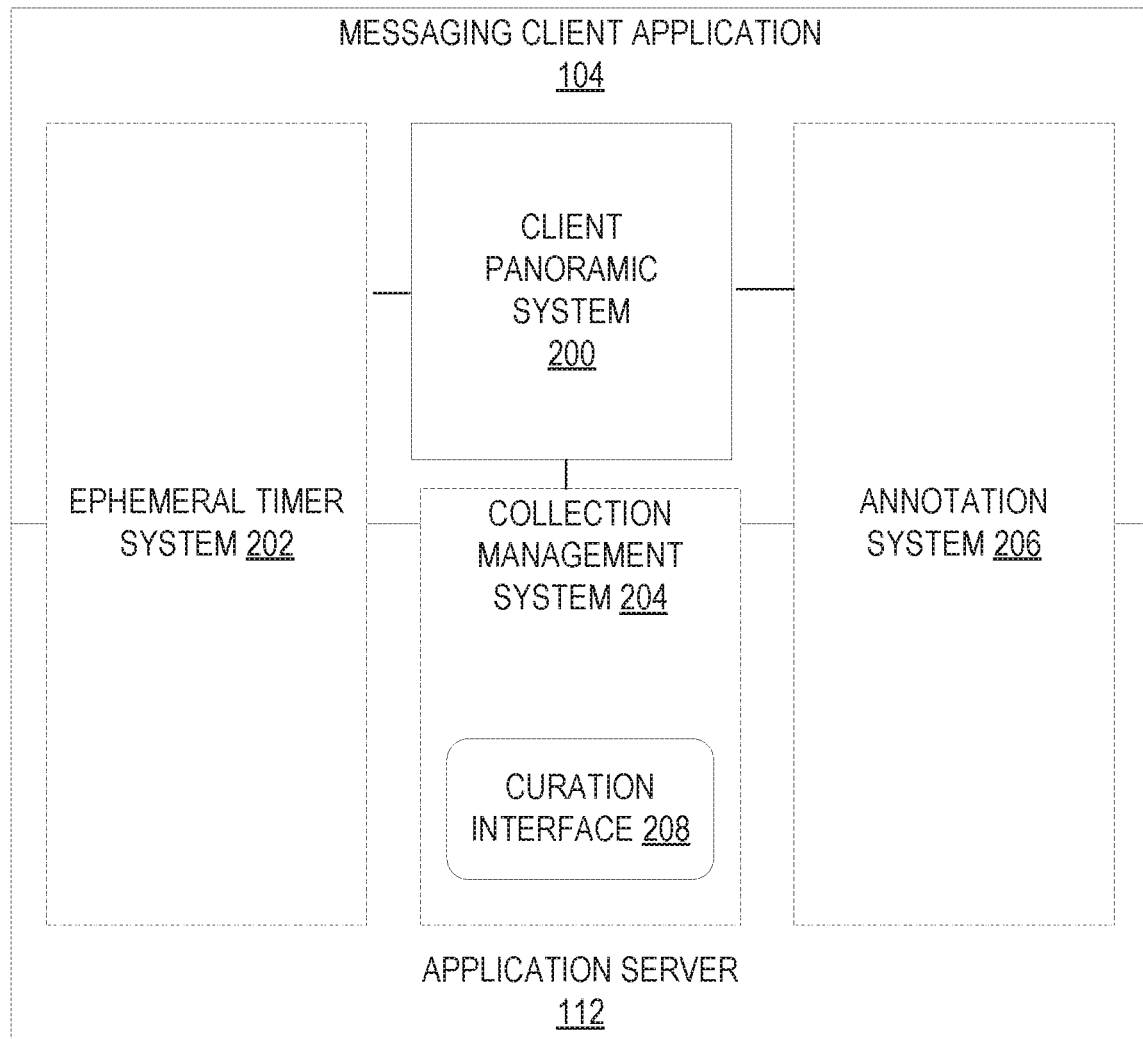
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a client panoramic system 200.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story," Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

In some example embodiments, the client panoramic system 200 is configured to display content in a user interface that uses one or more dynamic crop windows that enable users to simulate an immersive panoramic experience using their client devices (e.g., client device 102). Further details of the client panoramic system 200 are discussed below.

Figure 3:
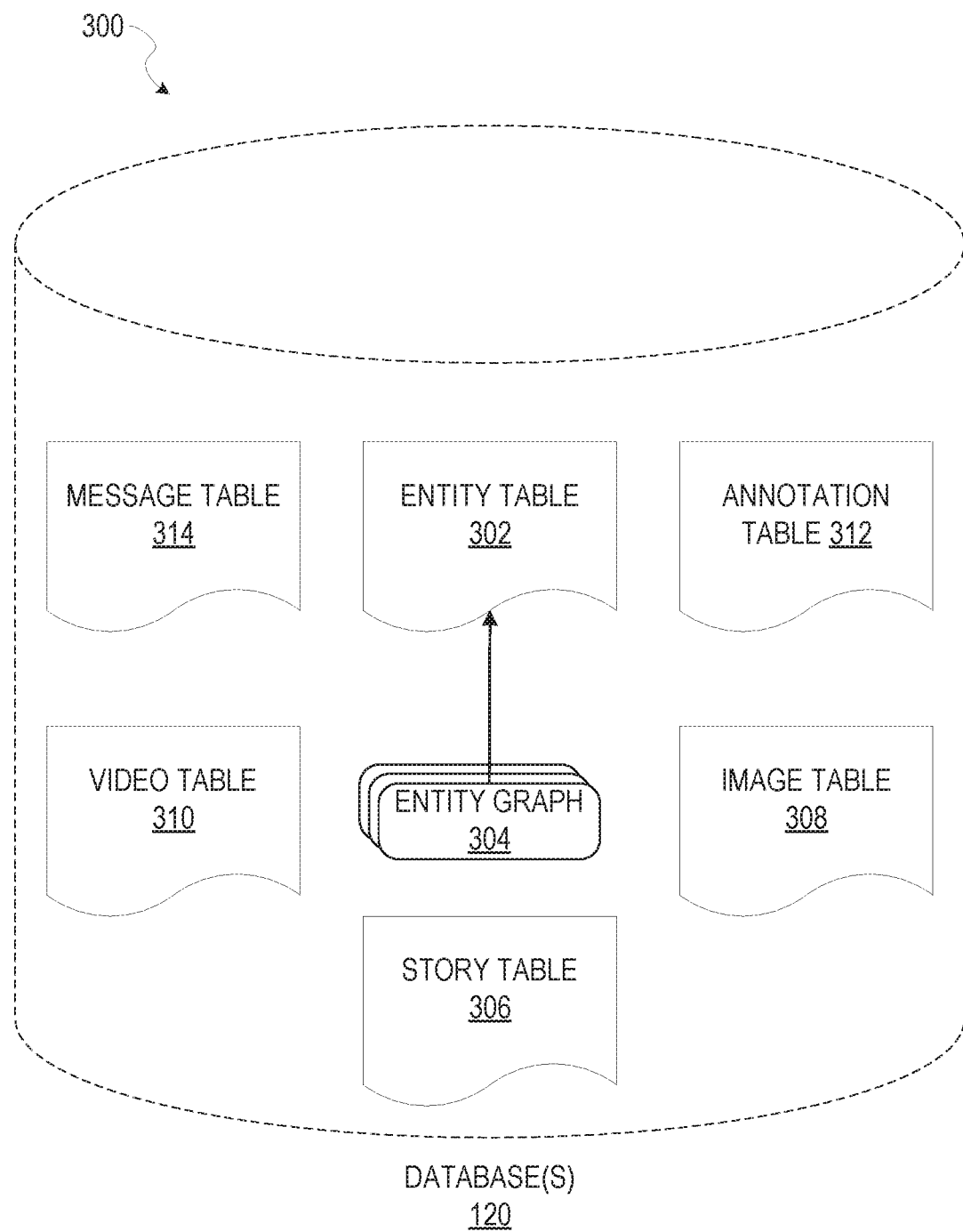
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
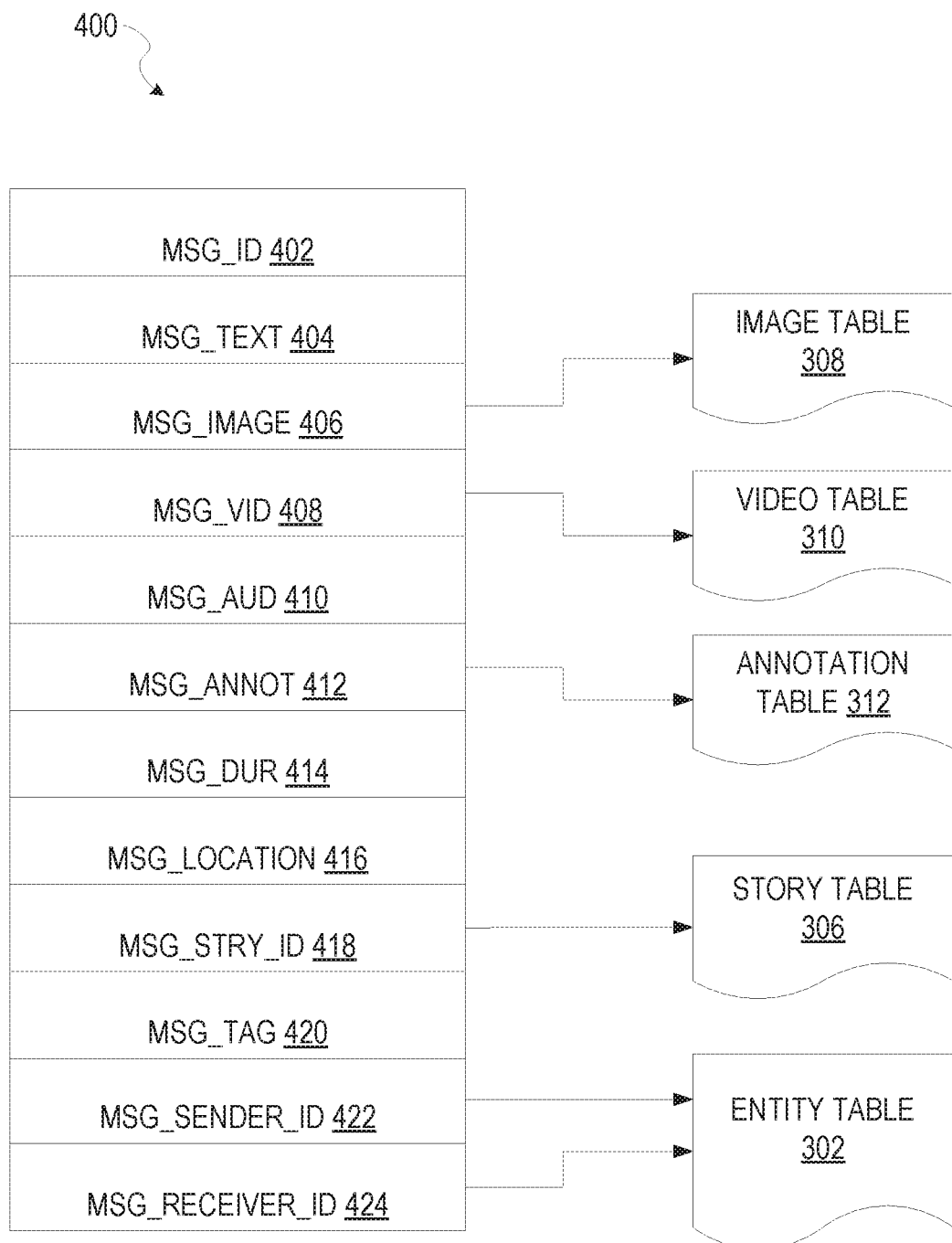
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
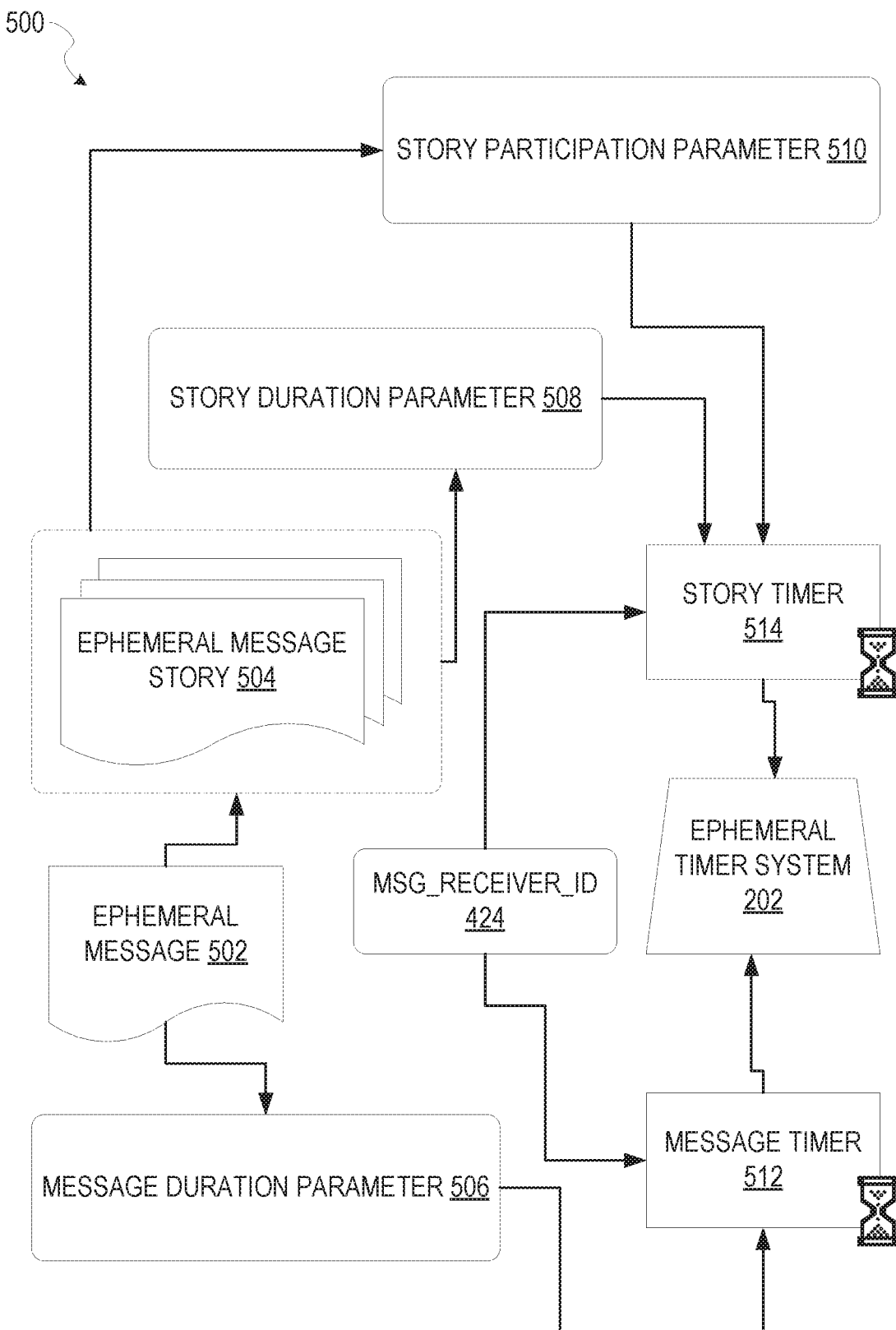
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504. The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring (via the story timer 514) in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
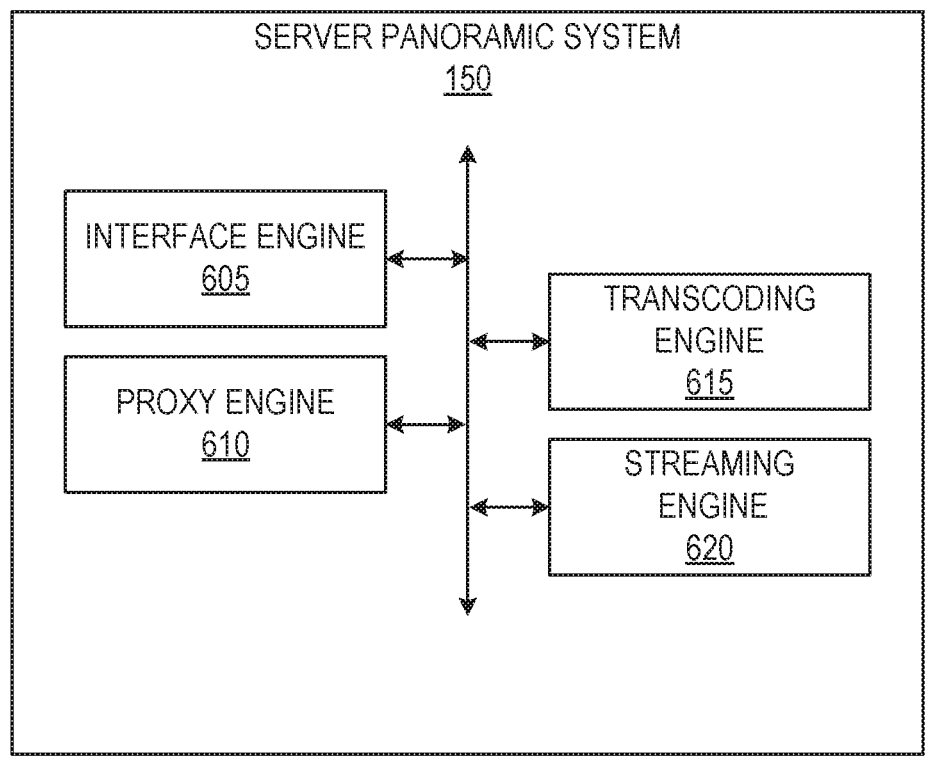
FIG. 6 shows internal functional components of a server panoramic system, according to some example embodiments

FIG. 6 shows internal functional components of a server panoramic system 150, according to some example embodiments. As illustrated, the server panoramic system 150 comprises an interface engine 605, a proxy engine 610, a transcoding engine 615, and a streaming engine 620. The interface engine 605 manages receiving content, such as live video streams, to distribute to users through a simulated interactive panoramic user interface, according to some example embodiments. For example, the interface engine 605 may receive an image or video generated by a user from his or her client device for distribution to other users through a viewing application, such as the messaging client application 104. The proxy engine 610 serves as a proxy for their video in embodiments where the video received via the interface engine 605 is part of a live video stream. Some example embodiments the proxy engine 610 decompresses a live video stream received by the interface engine 605, where the received video stream may have been encoded by a user's client device in one or more formats (e.g., RTMP). The transcoding engine 615 is configured to convert the received video to different formats and different quality levels, according to some example embodiments. For example, the transcoding engine 615 may convert the received video to a first file format that is compatible with the operating system of a first user's client device, and further convert received video to a second file format that is compatible with an operating system of a second user's client device, and so on. In some example embodiments the transcoding engine 615 also converts the received video to different display sizes for distribution to different types of client devices such as laptops, desktops, mobile devices. Further, in some example embodiments, the transcoding engine 615 converts the received video to different resolution and sound quality levels. As network speed for a given client device varies, the quality level of content sent (e.g., streamed) to the client device can be decreased so that the user can still view the content, albeit at a lower quality. The streaming engine 620 manages distributing the received content in different formats generated by the transcoding engine 615 to various content APIs of the different types of client devices. For example, the streaming engine 620 may communicate with an API of a streaming video player that is integrated into the messaging client application (e.g., messaging client application 104) so that the user of the messaging client application can view the streaming content through the application. Further, the streaming engine 620 may interface with a web browser to distribute the streamed content in a streaming; module of the web browser, and so on for different types of streaming client devices. In some example embodiments, the streaming engine 620 is further configured to communicate with the client devices (e.g. the streaming players integrated into the client devices) as part of a two-way communication to make continuous adjustments to the stream content as network conditions vary.

Figure 7:
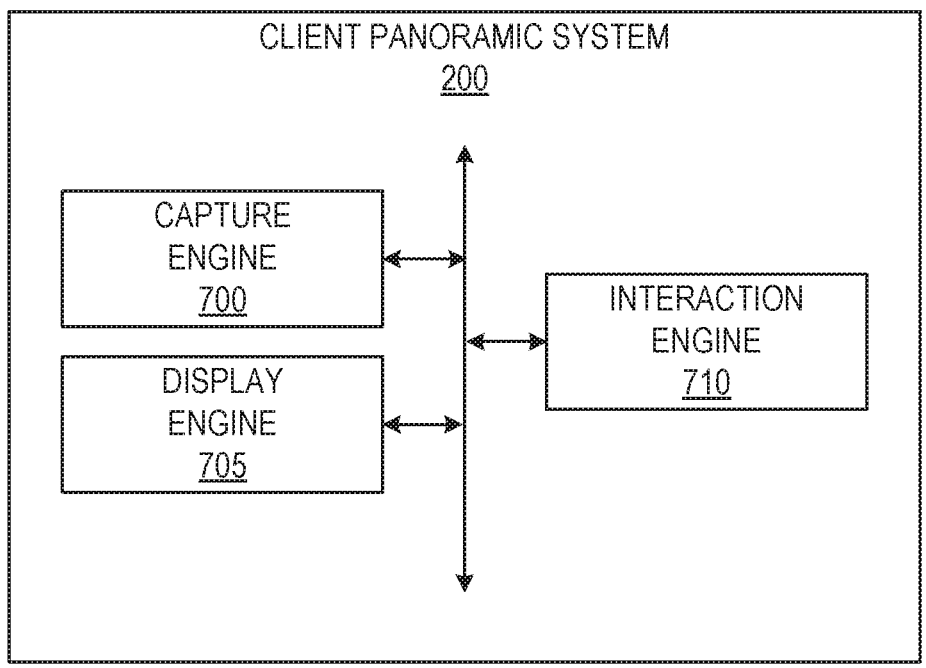
FIG. 7 shows example internal functional components of a client panoramic system, according to some example embodiments.

FIG. 7 shows example internal functional components of a client panoramic system 200, according to some example embodiments. As illustrated in FIG. 7, the client panoramic system 200 comprises a capture engine 700, a display engine 705, and an interaction engine 710. The capture engine 700 manages generating content to be shared with other users via the application server 112. For example, the capture engine can use an image sensor of a client device to generate an image or video which can be uploaded to the server panoramic system and streamed in real-time or near real-time by other users of a social network site. The display engine 705 manages interfacing with the streaming engine 622 to download or otherwise stream content for display in a simulated interactive panoramic user interface, discussed in further detail below. In some example embodiments, the display engine 705 is further configured to identify received content as being in a landscape orientation. In some example embodiments, the display engine 705 is further configured to generate a user interface that can display the content in a simulated interactive panoramic user interface that adjusts how content is viewed using one or more continuously updated crop windows.

The interaction engine 710 is configured to manage interactions between the users of the client panoramic system 200 and server interactions. For example, according to some example embodiments, the interaction engine 710 is configured to display one or more user interface buttons through which a user interacts with the client panoramic system 200. In some example embodiments, the user interface buttons include a button to turn on or off captions of the video, a button to control the play point in a timeline of a video being played, one or more buttons to control fast forwarding or rewinding, and receiving or otherwise identifying one or more instructions to pan a crop area of a primary view window, as explained in further detail below.

Figure 8A:
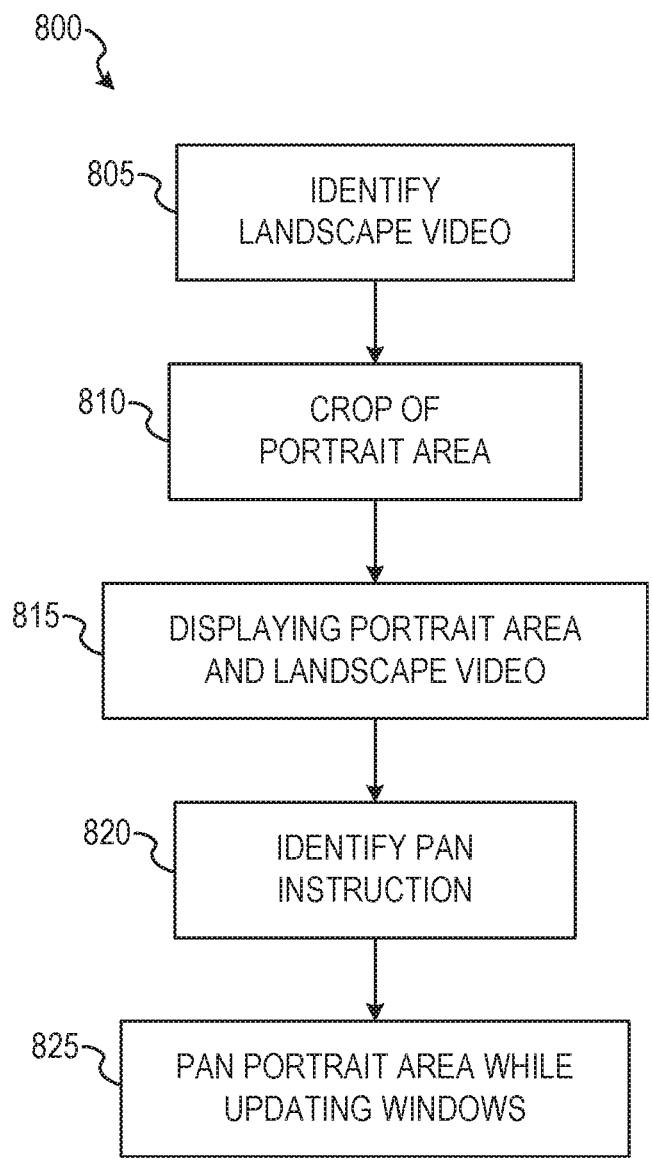
FIG. 8A-8D show a flow diagrams of methods for implementing a simulated interactive panoramic user interface, according to some example embodiments.
Figure 8B:
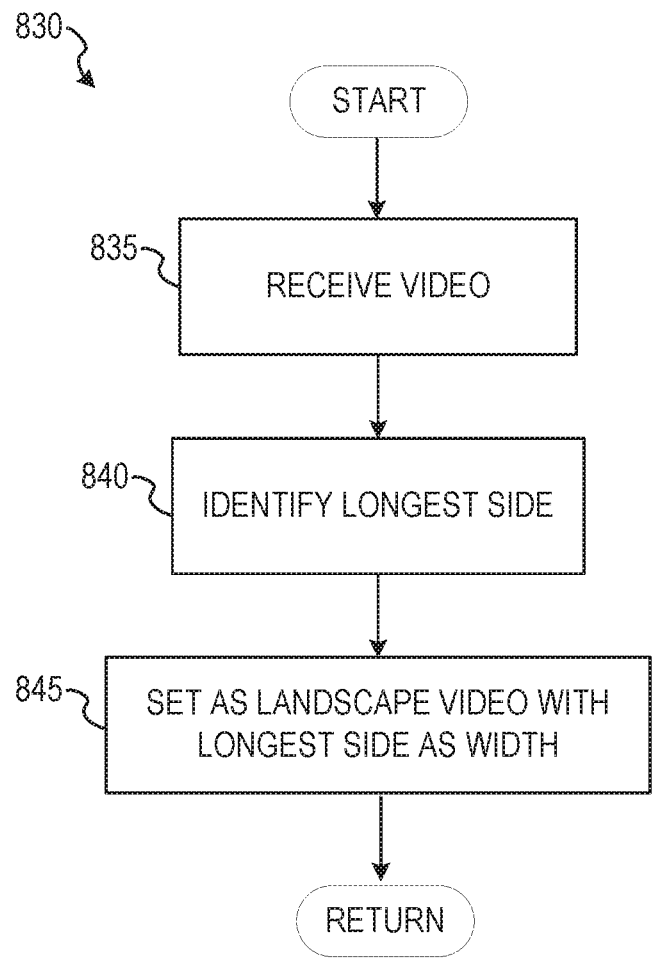

FIG. 8A shows a flow diagram of a method 800 for implementing a simulated interactive panoramic user interface, according to some example embodiments. At operation 805, the capture engine 700 identifies landscape video. For example, the capture engine 700 may use an image sensor of client device 102 to record video while the client device is held in a landscape orientation. In some example embodiments, at operation 805 the capture engine 700 identifies broadcast media as the landscape video. At operation 810, the display engine 705 crops a portrait area of the landscape video. The portrait area is a dynamic crop in a portrait orientation (e.g., 9:16 aspect ratio). At operation 815, the display engine 705 displays the portrait area in a primary view window of a user interface. The original landscape content generated or otherwise identified at operation 805 may be displayed in a panoramic window that is in a landscape orientation (e.g., 16:9 aspect ratio). At operation 820, the interaction engine 710 identifies a pan instruction. For example, a user swipes from left to right over the panoramic window. The interaction engine 710 receives the left to right swipe and generates an instruction to move the portrait area left within the landscape video. At operation 825, the display engine 705 pans the portrait area according to the pan instruction while continuously updating the portrait area and the panoramic window FIG. 8B shows a flow diagram of a method 830 for setting the received video as being a landscape orientation, according to some example embodiments. The method 830 may be implemented as a subroutine of operation 805. As illustrated, the subroutine may start with a start block and terminate with a return block in which modified data or newly generated data is stored. At operation 835, the display engine 705 receives one or more images, such as a still photo or video data such as a live streaming video. At operation 840, display engine 705 identifies the longest side of the received video. For example, the received video may be rectangular, where one set of sides are longer than another set of sides. At operation 845, the display engine 705 sets the video as being recorded in landscape orientation with the longest side being the width of the video and the shortest side of the received video being the height of the video.

Figure 8C:
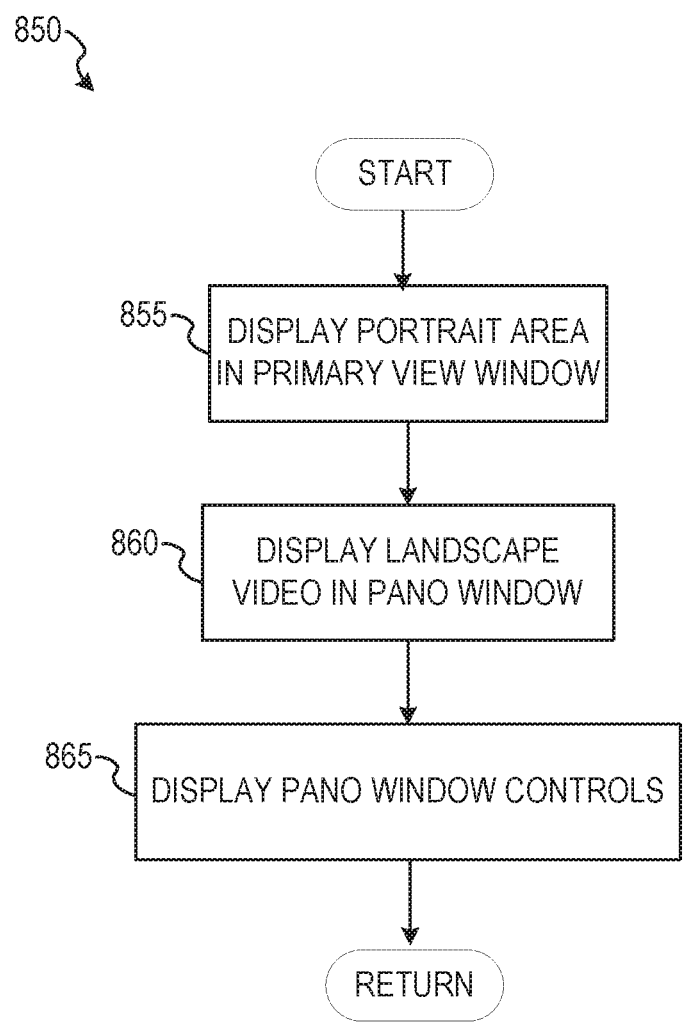

FIG. 8C shows a flow diagram of a method 850 for generating a user interface, according to some example embodiments. The method 850 may be implemented as a subroutine of operation 815. As illustrated, the subroutine may start with a start block and terminate with a return block in which modified data or newly generated data is stored. At operation 850, the display engine 705 displays the portrait area of the received video in a primary view window of a user interface. At operation 860, the display engine 705 displays the received video in a panoramic window of the user interface. In some example embodiments, the primary view window and the panoramic window share and adjacent side. For example, the bottom side of the primary view window and the top side of the panoramic window may share a border in the user interface.

At operation 865, the interaction engine 710 generates panoramic window controls and overlays visual user interface elements of the controls over the panoramic window generated at operation 860. The overlaid controls may indicate where the current crop area of the primary view window is located and one or more non-active areas which are out of frame of the primary view window areas, which may be darkened, to which a user can pan to via the panoramic window.

Figure 8D:
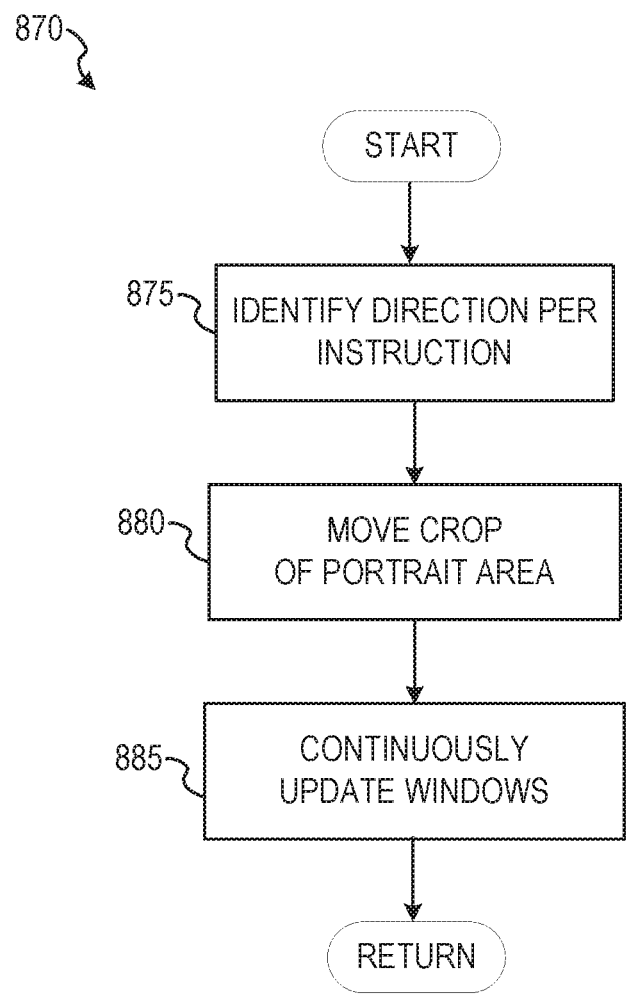

FIG. 8D shows a flow diagram of a method 870 for generating a pan instruction and continuously updating content, according to some example embodiments. The method 870 may be implemented as a subroutine of operation 825. As illustrated, the subroutine may start with a start block and terminate with a return block in which modified data or newly generated data is stored for further processing (e.g., display). At operation 875, the interaction engine 715 identifies a direction to pan the portrait area. For example, the interaction engine 715 may receive a swipe gesture and set the direction as parallel to the swipe gesture movement. At operation 880, the display engine 705 moves the portrait area in the direction according to the instruction. At operation 885, while the portrait area is moved, the content (e.g. streaming video) is continuously updated in the primary view window and the panoramic window. That is, for instance, operation 885 may be performed simultaneously (e.g. on additional processor threads) with operations 875 and 880 as the user pans to different areas of the content.

Figure 9:
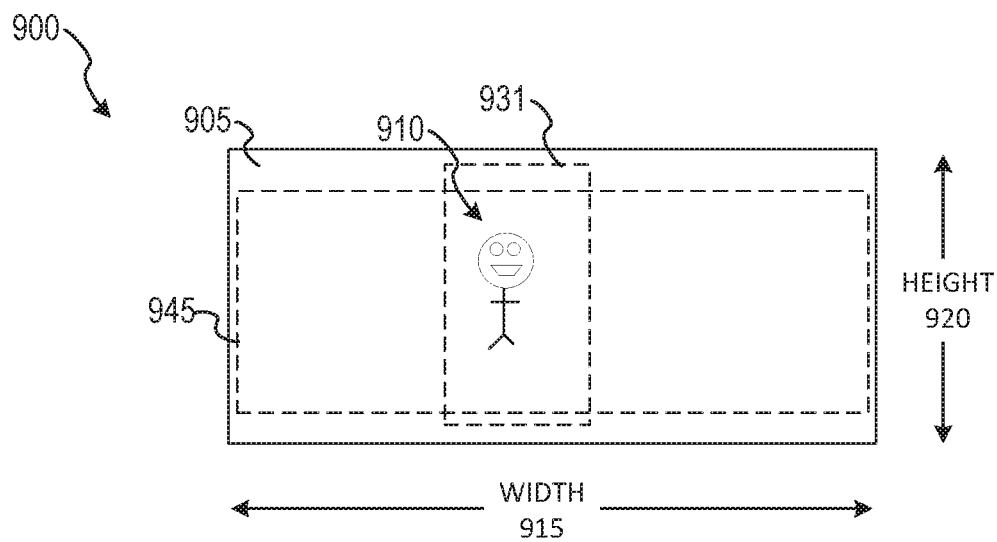
FIG. 9 shows example user interfaces for simulated interactive panoramic displays, according to some example embodiments.
Figure 9:
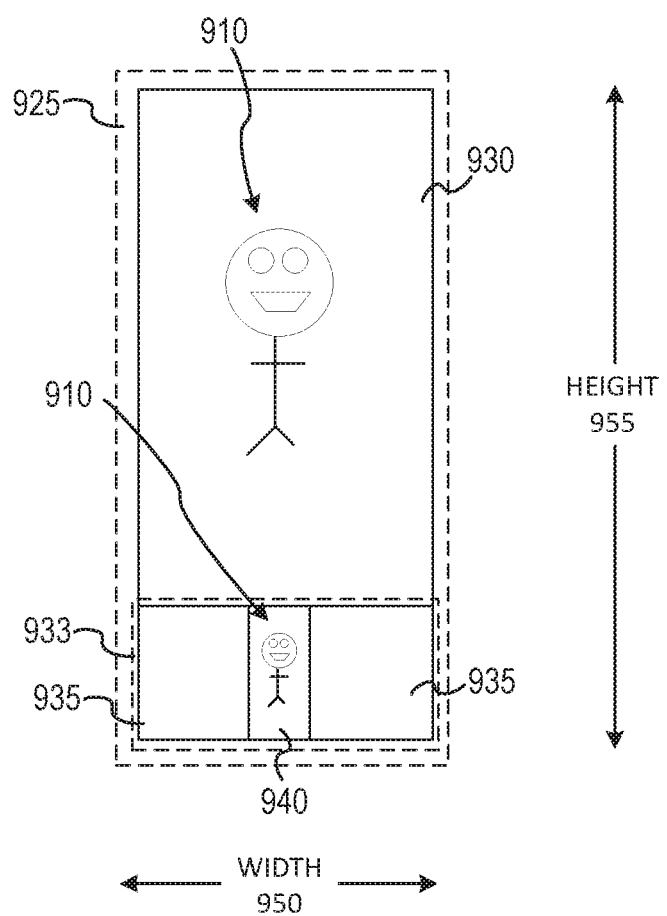

FIG. 9 shows example user interfaces for simulated interactive panoramic displays, according to some example embodiments. Content such as landscape video 905, which depicts a user 910, may be generated using an image sensor of a client device. The landscape video 905 has a width 915 that is longer than its height 920, and is an example of content recorded in a landscape orientation (e.g., aspect ratio of 16:9, 16/9, etc.). As discussed, viewing the landscape video 905 on a client device in portrait mode can result in poor user experience.

FIG. 9 further shows an example user interface 925 for viewing the landscape video 905 as simulated panoramic content, according to some example embodiments. In particular, user interface 925 comprises a primary view window 930 and a panoramic window 933. The primary view window 930 displays a dynamic crop 931 from the landscape video 905. As illustrated, the user interface 925 has a portrait orientation (e.g., 9:16 aspect ratio) with a width of 950 and a height 955. The primary view window 930 also has a portrait orientation (e.g., 9:16, 10:16, 9:21) which can be the same aspect ratio of the dynamic crop 931 or variations thereof to maximize the size of the primary view window 930 for different client device screen sizes. In some example embodiments, the content of the dynamic crop 931 is not resized when viewed in the primary view window, while in some other example embodiments, the content of the dynamic crop 931 may be up sampled to increase the size so the content fills the primary view window 930.

The panoramic window 933 can display a down sampled version of the landscape video 905. The panoramic window 933 comprises current view indicator 940 which can be a portrait orientation area showing what is actively being played or displayed in the primary view window 930. Further, the panoramic window 933 has one or more non-active view areas 935, which can be opaque or translucent (e.g., darkened). In the embodiments in which the non-active view areas 935 are translucent, a user viewing the panoramic window 933 can view image features that are out of frame of the primary view window 930 but still viewable in the panoramic window 933, albeit darkened. The panoramic window 933 is further configured with user interface controls that allow the user to move the current view indicator 940 (e.g., left, or right), thereby moving the dynamic crop 931, which in turn causes an update of what is displayed in the primary view window 930.

In some example embodiments, the aspect ratio of the panoramic window 933 is the same as the landscape video 905 such that the complete landscape video 905 may be visible in the panoramic window 933. In some example embodiments, the panoramic window 933 shares a landscape orientation with the landscape video 905 but only shows a portion or cropped area of the landscape video 905. For example, in some example embodiments, the panoramic window 933 may be a landscape crop 945 of the landscape video 905. This can decrease the size and amount of data needed to be processed and displayed in the panoramic window 933 while still giving the user insight into what image features are out of frame areas of the primary view window 930.

FIG. 10A-C show an example user interface 1000 for displaying panoramic content, according to some example embodiments. Generally, the content being displayed in FIGS. 10A through 10C is a live stream of a snowboarder 1011 recording herself with a camera (e.g., a smartphone in being held in landscape mode) as the snowboarder 1011 descends a snowy mountainside. The snowboarder 1011 may be a first user that is using message client application 104 to create a live stream video, which is uploaded to the server 140 for distribution through the server panoramic system 150 as discussed above. A second user (not depicted) may be using his/her client device 102 to view user interface 1000.

The user interface 1000 comprises a primary view window 1005 and a panoramic window 1010. The primary view window 1005 is displaying a dynamic portrait orientation crop of video recorded in a landscape orientation. As discussed, some or all of the original landscape orientation video is displayed in the panoramic window 1010. The panoramic window 1010 and further comprise a current view indicator 1020 which shows which portion of the original landscape video is currently being displayed in the primary view window 1005. The panoramic view window further comprises a non-active view area 1015, which is a shaded and or darkened area that allows a user viewing the user interface 1000 to view the content of the landscape video that is out of frame of the primary view window 1005. In some example embodiments, the user interface 1000 further comprises control buttons 1027 which may include a pause/play button, a timeline control, a volume control, a button to turn on/off captions, and a sharing button. A user may interact with the simulated interactive user interface 1000 by dragging his or her finger across the panoramic window 1010 as illustrated by icon 1025. For example, assume the user drags his or her finger starting over the current view indicator 1020 and moves it rightward, towards the non-active view areas 1015. This will cause the dynamic crop area (discussed in FIG. 9 but not illustrated in FIGS. 10A-C) to move to a different area within the original landscape video while the video is continuously playing in the primary view window 1005 and the panoramic window 1010, as further illustrated in FIG. 10B.

In FIG. 10 B, the user has dragged his or her finger to the middle portion of the panoramic window 1010 thereby moving the position of the current view indicator 1022 to center portion of the original landscape video. In response to receiving the user gesture, the dynamic crop of the landscape video has moved to a center portion and a snowboard 1011 is now displayed in the primary view window 1005. Moving to FIG. 10C, the user has further moved the current view indicator 1020 to the right portion of the original landscape video as indicated by the new position of icon 1025. Responsive to the further interaction, the dynamic crop changes what is displayed in the primary view window 1005 as the primary view plays video.

Figure 11A:
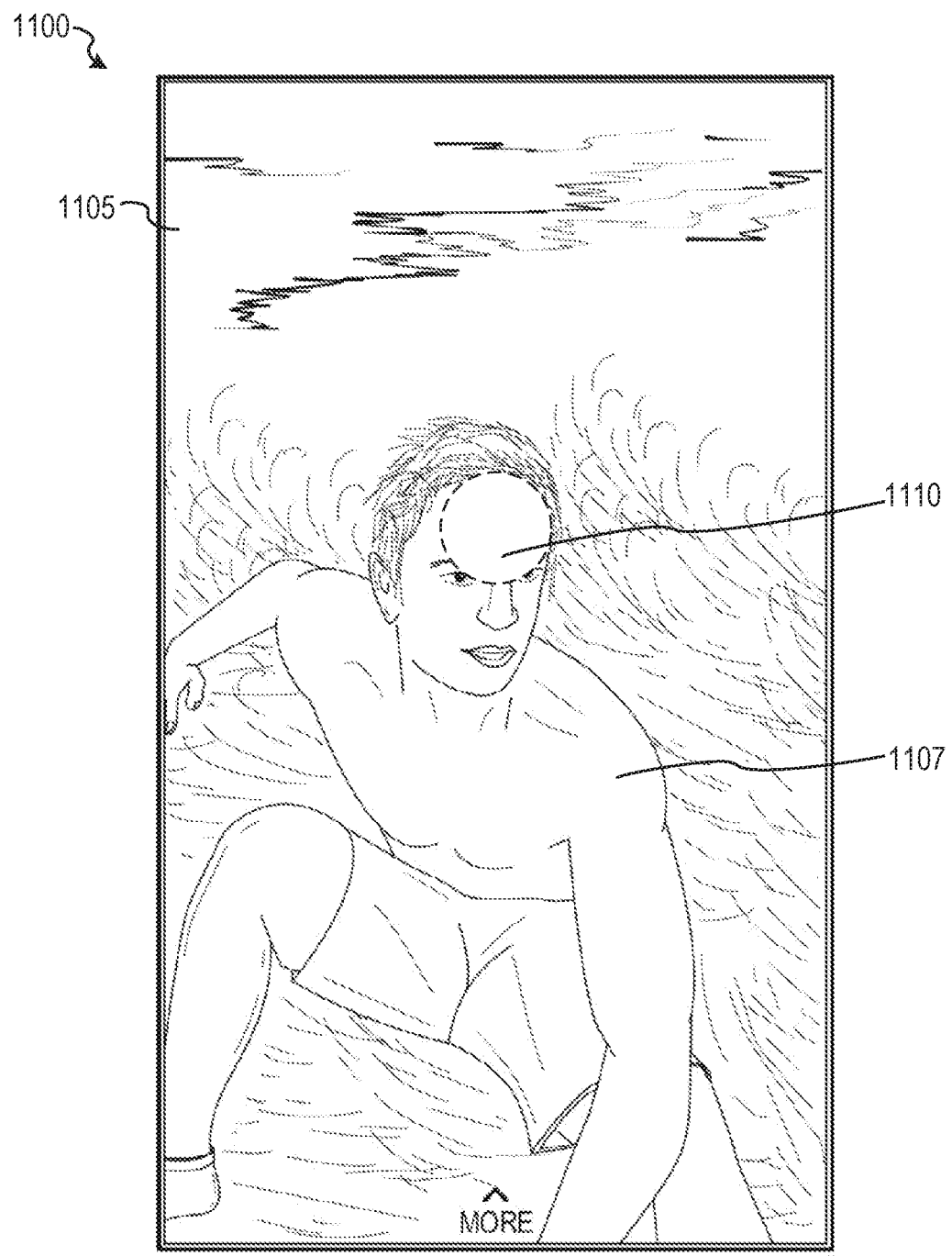
Figure 11B:
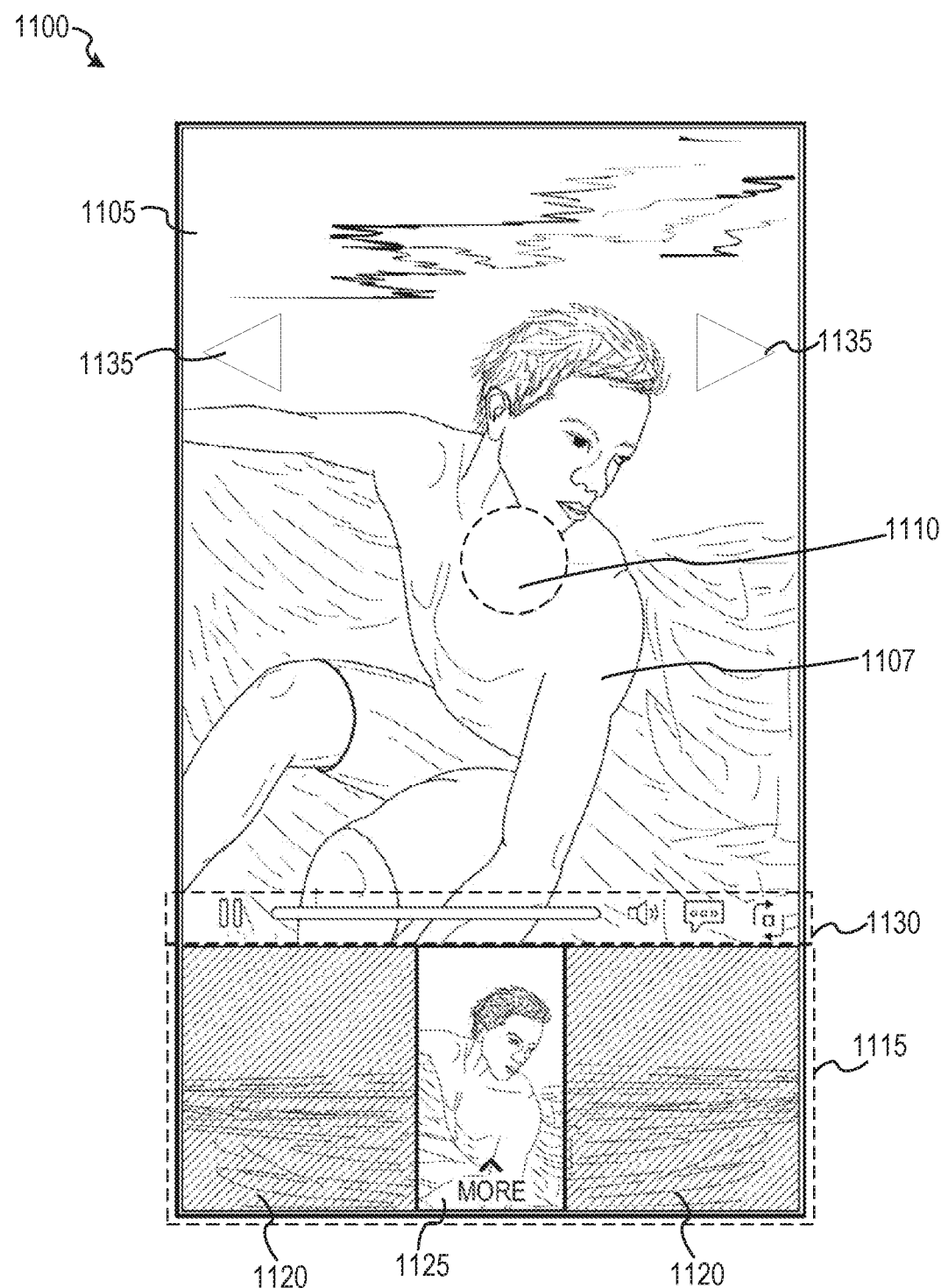
Figure 11C:
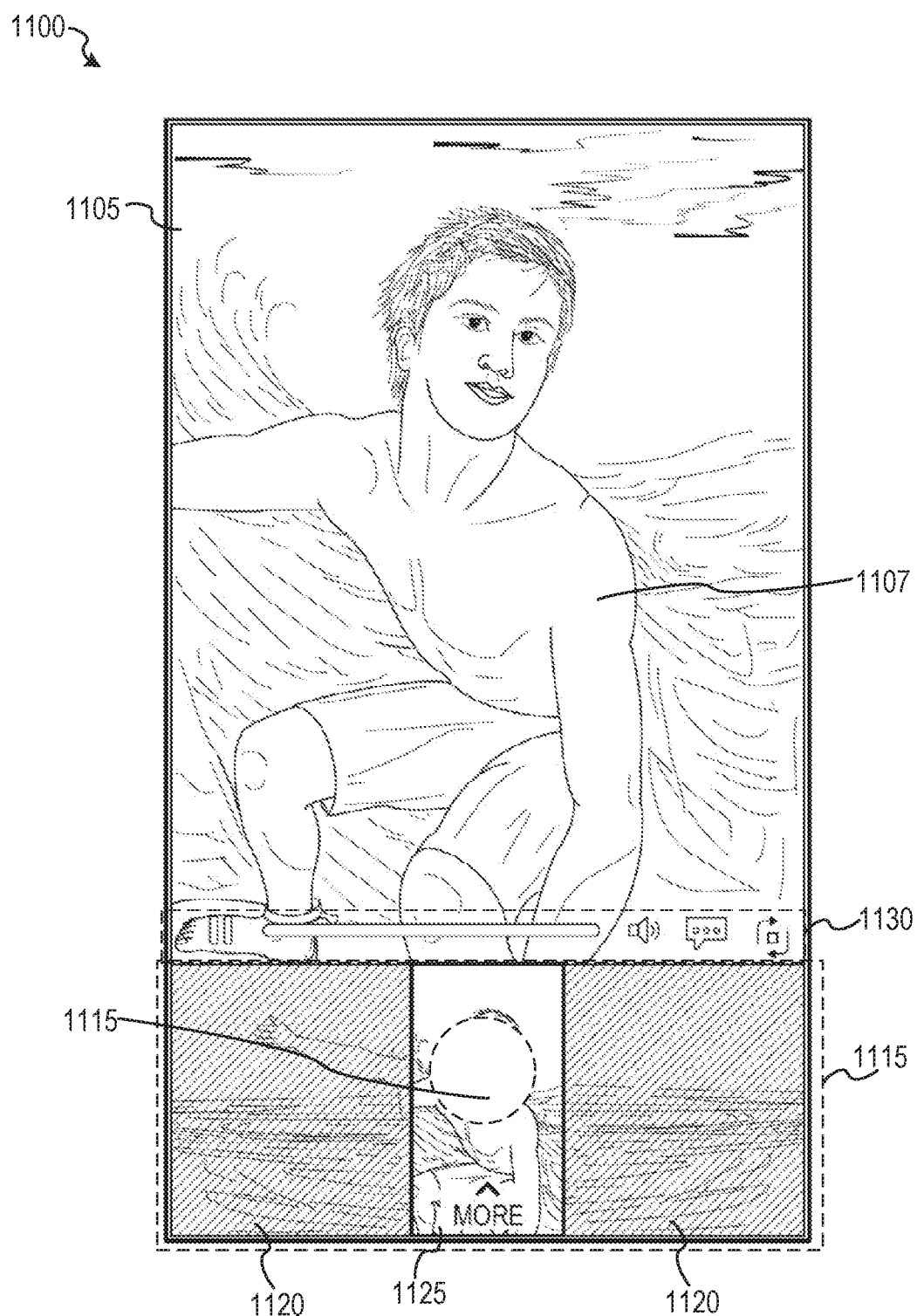
Figure 11D:
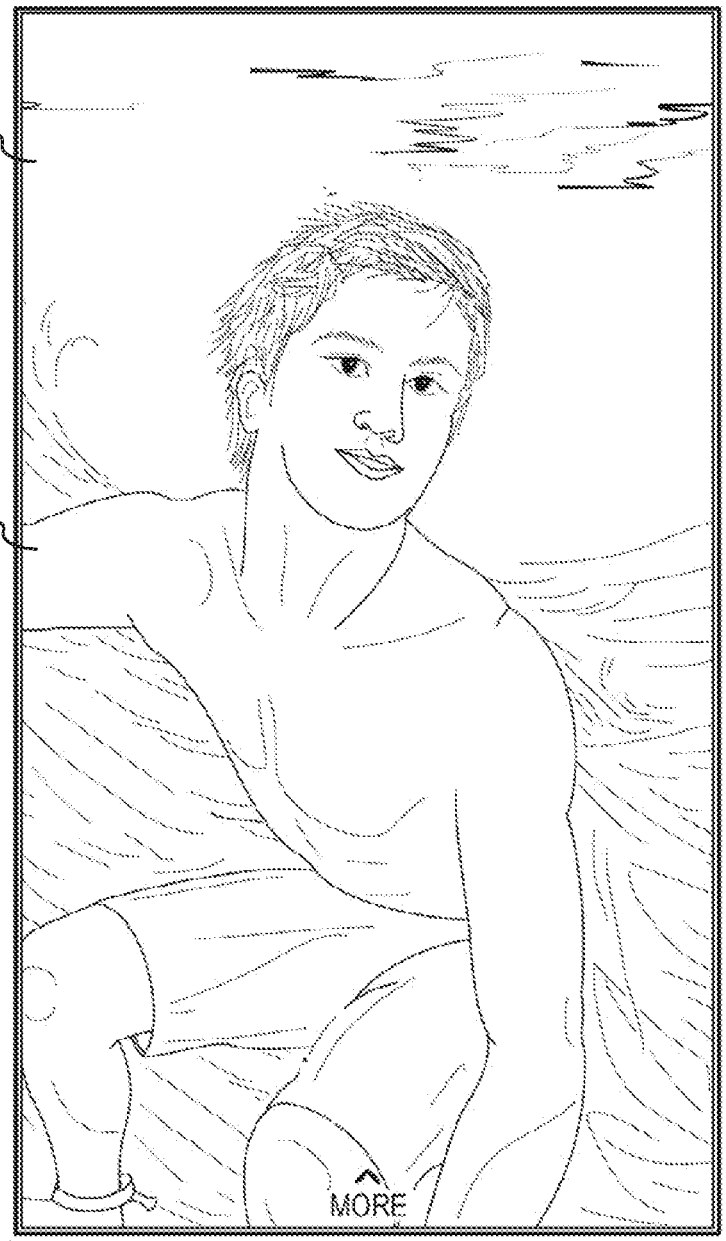

FIGS. 11A-11D shows a further example of a simulated interactive panoramic user interface 1100, according to some example embodiments. The content being displayed in FIGS. 11A-11D is a live stream of a surfer 1107 recording himself using a waterproof phone or camera in landscape mode as he thrashes some gnarly waves. The surfer 1107 may be a first user that is using message client application 104 to create a live stream video, which is uploaded to the server 140 for viewing. A second user (not depicted) may be using his/her client device 102 to view user interface 1100. As illustrated in FIG. 11A, user interface 1100 initially displays primary view window 1105 in a full-screen mode, in which the primary view window 1105 fills a full-screen area of message application 104 and the panoramic window is hidden or otherwise not displayed. As discussed, while the video content displayed primary view window 1105 appears to be recorded in portrait mode (e.g., vertical video) the content is actually a dynamic crop of landscape content as discussed above. In some example embodiments, when the user viewing the user interface 1100 rotates his/her client device so that it is in landscape mode, the display engine 705 switches the primary view window 1105 from a portrait orientation to a landscape orientation, and further displays the original landscape video in the newly rotated primary view window 1105. That is, with reference to FIG. 9, the display engine 705 can use one or more inertial sensors of the client device 102 to detect that the client device is being held upright in portrait mode. In response to a determination that the client device is being held in portrait mode, a dynamic crop 931 in a portrait orientation is displayed within the primary view window 930. However, when the display engine 705 uses the inertial sensors to detect that the client device 102 has been rotated to a landscape orientation (e.g., by detecting gravity vector using a gyro sensor), the primary view window 930 changes to landscape orientation to display the original landscape video 905. Further when the user rotates the client device 100 to back into portrait orientation, the primary view window 930 may again be changed to a portrait orientation, and again the dynamic crop 931 may automatically be displayed in the primary view window 930.

Returning to FIG. 11A, the user viewing the user interface 1100 may perform a gesture on the primary view window 1105 to bring up the panoramic window. For example, as illustrated by icon 1110, the user may tap on the screen displaying the user interface 1100. Moving to FIG. 11B, in response to the user tapping on user interface 1100, the panoramic window 1115 is displayed along with control buttons 1130. The panoramic window 1115 comprises a current view indicator 1125, and one or more non-active areas 1120, thereby indicating to a user viewing the user interface 1100 what area of the simulated panoramic video is being displayed in the primary view window 1105. Further, according to some example embodiments, the user interface 1100 can include skip buttons 1135. The skip buttons may be user selectable user interface buttons according to some example embodiments, while in other embodiments the skip buttons 1135 are visual indicators of what action to perform to fast forward or rewind. In some example embodiments, the content being displayed is live streaming video which is buffered on the client device 102, and the user viewing the user interface 1100 performs a tap and hold gesture on the right side or left side of user interface 1100 to initiate fast forwarding or rewinding to buffered frames. In some example embodiments, when the user performs a gesture to bring up the panoramic window 1115, the current view indicator 1125 is a dynamic crop of the center portion of the landscape video. In some example embodiments, the original landscape video is analyzed using one or more image feature detection schemes (e.g. a feature or attention neural network trained on user interactions with the streamed content) to determine what areas of the landscape video are most likely to depict an object most uses want to view in the primary window. For example, if the original landscape video is of a football being thrown in the air, the image detection schemes can place emphasis or otherwise weight the area of within the original landscape video depicting the flying football, and set the dynamic crop (thereby also setting the current view indicator 1125 and content displayed in the primary view window 1105) to follow the flying football. Moving to FIG. 11C, a user can re-enter full-screen mode and hide the panoramic window 1115 by performing a gesture, such as tapping anywhere within the panoramic window 1115, according to some example embodiments. Moving to FIG. 11D, in response to receiving the tap over the panoramic window 1115, the display engine 705 hides the panoramic window 1115 modifies the primary view window 1105 (changes the aspect ratio or pixel size of the primary window 1105) so that it fills an entire area of the user interface 1100.

In some example embodiments, the interaction engine 710 interfaces with an inertial sensor of the client device 102 to move the dynamic crop area and pan to different areas of the original landscape video. For example, the interaction engine 710 can use an inertial sensor of the client device to detect that the client device is being rotated clockwise 20°. Responsive to the detection of movement, the display engine 705 pans the dynamic crop of the original landscape video in the rightward direction within the original video, thereby causing the surfer 1107 to move out of view in the primary view window 1105. Likewise, if the user viewing the user interface 1100 rotates the client device counter-clockwise, the dynamic crop may be moved a proportional amount within the landscape video, thereby moving the surfer 1107 back into view, depending on the amount of rotation and size of the original landscape video.

In some example embodiments, the original landscape content (e.g., image, video) is in a large format, such as a panoramic image (e.g., with a width far longer than height) or 360 degree content. In those embodiments, a landscape crop (e.g., landscape crop 945) of the large format content is shown within the panoramic window (e.g., panoramic window 933), while a vertical crop (e.g., dynamic crop 931) of the panoramic content is displayed in the primary view window (e.g. primary view window 930). Thus, in some example embodiments, both the primary view window and the panoramic window are crops of the original video, where the content displayed within the respective windows is continuously updated (e.g., played, animated on screen) as the user changes the location of the crops. For example, with reference to FIG. 9, the landscape crop 945 can be panned right and left by physically rotating the client device 102 (e.g., detecting rotation using an inertial sensor, as discuss above). However, to change location of the dynamic crop 931, the user may use a slide gesture to move a current view indicator 940 in the panoramic view window 933.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1300 of FIG. 13 that includes, among other things, processors, memory, and I/O components. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes a memory/storage 1256, which also has the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1212. Operationally, the applications 1216 and/or other components within the layers may invoke API calls 1208 through the software stack and receive a response in the form of messages 1212. The layers illustrated are representative in nature, and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling); component management; networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provides a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems, interactions with a user may occur through a presentation layer, such as the presentation layer 1214. In these systems, the application/component "logic" can be separated from the aspects of the application/component that interact with a user.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor cache memory accessible to processors 1312 or 1314), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion, and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Data-glyph, Maxi-Code, PDF418, Ultra Code, UCC RSS-2D barcode, and other optical codes), or acoustic detection components (e.g. microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions 1316 for execution by the machine 1300, and includes digital or analog communications signals or other intangible media to facilitate communication of such instructions 1316. Instructions 1316 may be transmitted or received over the network 1380 using a transmission medium via a network interface device and using any one of a number of well-known transfer protocols.

"CLIENT DEVICE" in this context refers to any machine 1300 that interfaces to a network 1380 to obtain resources from one or more server systems or other client devices 102. A client device 102 may be, but is not limited to, a mobile phone, desktop computer, laptop, PDA, smartphone, tablet, ultra-book, netbook, multi-processor system, microprocessor-based or programmable consumer electronics system, game console, set-top box, or any other communication device that a user may use to access a network 1380.

"COMMUNICATIONS NETWORK" in this context refers to one or more portions of a network 1380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide interoperability for Microwave Access WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium"

should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions 1316 (e.g., code) for execution by a machine 1300, such that the instructions 1316, when executed by one or more processors 1310 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing; certain operations and may be configured or arranged in a certain physical manner. In various example embodiments, one or more computer systems (e.g., a standalone computer system, a client computer system, or a server computer system) or one or more hardware components of a computer system (e.g., a processor 1312 or a group of processors 1310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1300) uniquely tailored to perform the configured functions and are no longer general-purpose processors 1310. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1312 configured by software to become a special-purpose processor, the general-purpose processor 1312 may be configured as respectively different special-purpose processors (e.g., comprising different hardware components) at different times. Software accordingly configures a particular processor 1312 or processors 1310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented components that operate to perform one or more operations or functions described herein. As used herein, "processor-implemented component" refers to a hardware component implemented using one or more processors 1310. Similarly, the methods described herein may be at least partially processor-implemented, with a particular processor 1312 or processors 1310 being an example of hardware. For example, at least some of the operations of a method may be performed by one or more processors 1310 or processor-implemented components. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an API). The performance of certain of the operations may be distributed among the processors 1310, not only residing within a single machine 1300, but deployed across a number of machines 1300. In some example embodiments, the processors 1310 or processor-implemented components may be located in a single geographic location (e.g., within a home environment, an office environment, or a server farm). In other example embodiments, the processors 1310 or processor-implemented components may be distributed across a number of geographic locations.

"PROCESSOR" in this context refers to any circuit or virtual circuit (a physical circuit emulated by logic executing on an actual processor 1312) that manipulates data values according to control signals (e.g., "commands," "op codes," "machine code," etc.) and which produces corresponding output signals that are applied to operate a machine 1300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1310 may further be a multi-core processor 1310 having two or more independent processors 1312, 1314 (sometimes referred to as "cores") that may execute instructions 1316 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
identifying, using at least one processor of a client device, a video sequence having a landscape orientation;
displaying, on a screen of the client device in a portrait orientation, a user interface comprising a vertical video window and a horizontal video window, the vertical video window having a portrait orientation relative to the landscape orientation, the video sequence simultaneously playing in the horizontal video window in the landscape orientation and in the vertical video window in the portrait orientation, the vertical video window playing a cropped portion of the video sequence, wherein the horizontal video window comprises a current view indicator portion playing the same cropped portion of the video sequence as the vertical window and a non-active view area playing, shaded or darkened, a remaining portion of the video sequence that is not the cropped portion of the video sequence, and wherein the horizontal video window and the vertical video window are displayed across a full width of the screen, and a top side of the horizontal video window is below and adjacent to a bottom side of the vertical video window or a bottom side of the horizontal video window is above and adjacent to a top side of the vertical video window;
identifying an instruction based on a user input to pan the video sequence playing in the vertical video window;
responsive to the instruction, panning the vertical video window to display a different cropped portion of the video sequence while the video sequence is simultaneously played in the horizontal video window;
identifying, using one or more image feature detection modules performed by the at least one processor of the client device, an object depicted in the cropped portion of the video sequence; and
responsive to a movement of the object towards a left side or a right side of the cropped portion, panning the vertical video window in a left direction or a right direction, respectively, and moving the current view indicator portion to correspond with the panning of the vertical video window.

2. The method of claim 1, wherein the vertical video window and the horizontal video window simultaneously play a same portion of the video sequence.

3. The method of claim 1, wherein the horizontal video window includes a visual indication of a current location of the cropped portion.

4. The method of claim 3, wherein the visual indication is a user interface control for panning the cropped portion.

5. The method of claim 4, wherein identifying the instruction comprises receiving the instruction through the user interface control.

6. The method of claim 1, further comprising:
detecting, using an inertial sensor of the client device, movement of the client device; and
wherein identifying the instruction comprises generating the instruction to pan the cropped portion in response to detecting the movement of the client device.

7. The method of claim 1, further comprising:
receiving a user gesture on the user interface of the client device; and
wherein identifying the instruction comprises generating the instruction to pan the cropped portion in response to receiving the user gesture.

8. The method of claim 1, wherein the horizontal video window fills a lower portion of the user interface and wherein the vertical video window fills an upper portion of user interface.

9. The method of claim 1, wherein the video sequence is generated by another client device in landscape mode such that each frame in the video sequence has a landscape aspect ratio, and wherein the client device that is displaying the user interface is in portrait mode such that the vertical video window has a portrait aspect ratio that is a reciprocal of the landscape aspect ratio.

10. The method of claim 9, wherein the video sequence is generated by the another client device and displayed on the client device in real-time or near real time.

11. The method of claim 9, further comprising:
buffering, in memory of the client device, the video sequence;
receiving, by the client device, an instruction to skip one or more frames of the video sequence; and
responsive to the instruction, displaying one or more subsequent frames from the video sequence in the buffer according to the instruction.

12. A system comprising:
one or more processors of a machine;
a display device; and
a memory storing instructions that, when executed by the one or more processors, cause the machine to perform operations comprising:
identifying, using at least one processor of a client device, a video sequence having a landscape orientation;
displaying, on a screen of the client device in a portrait orientation, a user interface comprising a vertical video window and a horizontal video window, the vertical video window having a portrait orientation relative to the landscape orientation, the video sequence simultaneously playing in the horizontal video window in the landscape orientation and in the vertical video window in the portrait orientation, the vertical video window playing a cropped portion of the video sequence, wherein the horizontal video window comprises a current view indicator portion playing the same cropped portion of the video sequence as the vertical window and a non-active view area playing, shaded or darkened, a remaining portion of the video sequence that is not the cropped portion of the video sequence, and wherein the horizontal video window and the vertical video window are displayed across a full width of the screen, and a top side of the horizontal video window is below and adjacent to a bottom side of the vertical video window or a bottom side of the horizontal video window is above and adjacent to a top side of the vertical video window;

identifying an instruction based on a user input to pan the video sequence playing in the vertical video window;

responsive to the instruction, panning the vertical video window to display a different cropped portion of the video sequence while the video sequence is simultaneously played in the horizontal video window;

identifying, using one or more image feature detection modules performed by the at least one processor of the client device, an object depicted in the cropped portion of the video sequence; and responsive to a movement of the object towards a left side or a right side of the cropped portion, panning the vertical video window in a left direction or a right direction, respectively, and moving the current view indicator portion to correspond with the panning of the vertical video window.

13. The system of claim 12, wherein the vertical video window and the horizontal video window simultaneously play a same portion of the video sequence.

14. A non-transitory machine-readable storage device embodying instructions that, when executed by a machine, cause the machine to perform operations comprising:

identifying, using at least one processor of a client device, a video sequence having a landscape orientation;

displaying, on a screen of the client device in a portrait orientation, a user interface comprising a vertical video window and a horizontal video window, the vertical video window having a portrait orientation relative to the landscape orientation, the video sequence simultaneously playing in the horizontal video window in the landscape orientation and in the vertical video window in the portrait orientation, the vertical video window playing a cropped portion of the video sequence, wherein the horizontal video window comprises a current view indicator portion playing the same cropped portion of the video sequence as the vertical window and a non-active view area playing, shaded or darkened, a remaining portion of the video sequence that is not the cropped portion of the video sequence, and wherein the horizontal video window and the vertical video window are displayed across a full width of the screen, and a top side of the horizontal video window is below and adjacent to a bottom side of the vertical video window or a bottom side of the horizontal video window is above and adjacent to a top side of the vertical video window;

identifying an instruction based on a user input to pan the video sequence playing in the vertical video window;

responsive to the instruction, panning the vertical video window to display a different cropped portion of the video sequence while the video sequence is simultaneously played in the horizontal video window;

identifying, using one or more image feature detection modules performed by the at least one processor of the client device, an object depicted in the cropped portion of the video sequence; and responsive to a movement of the object towards a left side or a right side of the cropped portion, panning the vertical video window in a left direction or a right direction, respectively, and moving the current view indicator portion to correspond with the panning of the vertical video window.

15. The non-transitory machine-readable storage device of claim 14, wherein the vertical video window and the horizontal video window simultaneously play a same portion of the video sequence.

16. The method of claim 1, wherein the vertical video window is displayed with an aspect ratio of 9:16 and the horizontal video window is displayed with an aspect ratio of 16:9.

17. The method of claim 1, wherein the top side of the horizontal window and the bottom size of the vertical window are a same size and wherein the bottom side of the horizontal window is the same size as the top side of the vertical window.

* * * * *